(12) United States Patent
Harel et al.

(10) Patent No.: US 11,433,826 B2
(45) Date of Patent: Sep. 6, 2022

(54) TRANSPORT SYSTEM FOR VEHICLES WITH PLATFORMS WITH TWO FIXED SIDEWALLS

(71) Applicants: Alex Harel, Savion (IL); Shalom Green, Haifa (IL); Ohad Zecharia, Kibutz Shomrat (IL)

(72) Inventors: Alex Harel, Savion (IL); Shalom Green, Haifa (IL); Ohad Zecharia, Kibutz Shomrat (IL)

( * ) Notice: Subject to any disclaimer, the term of this patent is extended or adjusted under 35 U.S.C. 154(b) by 0 days.

(21) Appl. No.: 17/467,212

(22) Filed: Sep. 5, 2021

(65) Prior Publication Data

US 2021/0394685 A1 Dec. 23, 2021

Related U.S. Application Data

(63) Continuation-in-part of application No. 17/111,531, filed on Dec. 4, 2020, now abandoned, which is a continuation-in-part of application No. 16/845,099, filed on Apr. 10, 2020, now abandoned, which is a continuation-in-part of application No. 16/231,429, filed on Dec. 22, 2018, now abandoned, which is a continuation-in-part of application No. 15/562,418, filed as application No. PCT/IL2016/050381 on Apr. 12, 2016, now abandoned.

(30) Foreign Application Priority Data

Apr. 12, 2015 (IL) .......................................... 238236

(51) Int. Cl.
*B60P 1/64* (2006.01)
*B60R 9/06* (2006.01)
*B62D 33/02* (2006.01)

(52) U.S. Cl.
CPC .............. *B60R 9/06* (2013.01); *B60P 1/6445* (2013.01); *B62D 33/0207* (2013.01)

(58) Field of Classification Search
CPC .................................................... B60P 1/6445
See application file for complete search history.

(56) References Cited

U.S. PATENT DOCUMENTS

| 2,517,304 | A | * | 8/1950 | Greening | ............... | B60P 3/2215 |
|---|---|---|---|---|---|---|
| | | | | | | 280/107 |
| 3,119,503 | A | * | 1/1964 | Herpich | ................ | B60P 1/6427 |
| | | | | | | 414/498 |
| 4,491,452 | A | * | 1/1985 | Matovich | .............. | B60B 29/002 |
| | | | | | | 414/427 |
| 5,417,540 | A | * | 5/1995 | Cox | ....................... | B60P 1/6427 |
| | | | | | | 414/537 |

(Continued)

*Primary Examiner* — Jonathan Snelting

(57) ABSTRACT

A standalone adjustable transportation system that is designed to be positioned on a platform of a vehicle that has two fixed sidewalls that includes a cargo carrier basket with a height ranging from 50 cm to 90 cm with four upper corners to each of which is connected a hollow tube, four adjustable legs that each one of them has a trailer jack that is designed to control the length of the adjustable leg and four connecting rods that each of which can be inserted into said hollow tubes. The cargo carrier basket while positioned on the platform that has two fixed sidewalls can be connected in its four top corners to the four adjustable legs by the four connecting rods over said two fixed sidewalls.

2 Claims, 3 Drawing Sheets

(56) References Cited

U.S. PATENT DOCUMENTS

| | | | | |
|---|---|---|---|---|
| 6,155,770 | A * | 12/2000 | Warhurst | B65D 90/143 |
| | | | | 414/458 |
| 6,537,015 | B2 * | 3/2003 | Lim | B60P 1/6445 |
| | | | | 410/80 |
| 7,811,044 | B2 * | 10/2010 | Warhurst | B66C 19/007 |
| | | | | 414/458 |
| 8,434,990 | B2 * | 5/2013 | Claussen | B65D 88/32 |
| | | | | 254/89 R |

* cited by examiner

TRANSPORT SYSTEM FOR VEHICLES WITH PLATFORMS WITH TWO FIXED SIDEWALLS

RELATED APPLICATIONS

This application is a continuation in part of U.S. patent application Ser. No. 17/111,531 filed on Dec. 4, 2020, which is which is a continuation in part of U.S. Ser. No. 16/845,099 filed on Oct. 4, 2020, which is a continuation in part of U.S. Ser. No. 16/231,429 filed on Dec. 22, 2018, which is a continuation in part of U.S. patent application Ser. No. 15/562,418 filed on Sep. 28, 2017, which is a National Phase of PCT Patent Application No. PCT/IL2016/050381 having International filing date of 12 Apr. 2016, which claims the benefit of priority under 35 USC § 119(e) of IL Patent Application No. 238236 filed on 12 Apr. 2015. The contents of the above applications are all incorporated by reference as if fully set forth herein in their entirety.

TECHNICAL FIELD

The present invention refers to a standalone adjustable transportation system that includes a cargo carrier basket, a frame, adjustable legs, and trailer jacks.

BACKGROUND ART

There are many different cases and situations in which water tanks are required to be transported to open areas, for instance, when army forces are deployed in training or staging areas, or when the general public is participating in a large, outdoor event on.

In such cases, it is currently customary to supply water using a water trailer that is towed by an appropriate vehicle. A standard water trailer consists of a water tank that is installed on a trailer. The vehicle tows the water trailer to the designated site, where it is detached from the vehicle, which later returns to picks it up when the event is over. The use of a standard water trailer entails several problems. First, the trailer itself, which is an integral part of the water trailer, must be left at the site for the entire time the water tank is required. Second, standard water trailers must be positioned on level and flat surfaces and cannot be used in non-level locations. The present invention addresses these two problems, as well as several others.

Publication FR2318760 (hereinafter "patent 760") discloses a device which is designed to be assembled on a vehicle. The device of patent 760 includes a bucket (2) which is installed on a frame (4), two or four telescopic legs (6) that each of them ended with a sole (8). Each telescopic leg (6) includes two plug-in tubes, one of which has a diametric hole and the other has a series of diametrically spaced holes in longitudinal direction, and a pin is used to connect them together. For moving the bucket (2) from the vehicle and to place it on the ground there is a need to lift up the bucket and for that the device of patent 760 includes two horizontal cylinders (16) that push horizontally the lower part of a pair of lifting arms (13). Due to the structure of these lifting arms (13), when their lower parts are pushed horizontally then their upper part, which equipped with a wheel (17), rise upwards and lift up the frame and the bucket. Note, that the numbers in this paragraph refers to the numbers as stated in patent 760. The device of patent 760 is cumbersome, includes many parts, and has different structure than the adjustable transportation system. For example, the structure of the adjustable transportation system, which is the subject matter of the present invention, enables the user to control the precise length of each adjustable leg and by that enables the user to place the system on potholes and non-level and uneven ground also while it is at a horizontal and level position even on potholes, non-level and uneven ground.

Publication U.S. Pat. No. 3,119,503 (hereinafter "patent 503") describes a truck with chassis and motor that includes a permanent body and a set-off body, which may be raised and lowered to the ground on the relevant site. The set-off body includes parts for assembling and locking it onto the permanent body. The set-off body of patent 503 cannot be used with any kind of trailer but only with a specific model of a truck to which the platform is designed and fitted.

Publication U.S. Pat. No. 6,155,770 describes a hydraulically actuated mobile carrier frame wraps around a storage container of standard size and lifts the container from the ground onto a transport vehicle that includes many parts and components that make it cumbersome, difficult to operate and relatively expensive. In contrast, the system of the present invention consists of a small number of parts; it is efficient relatively cheap.

Publication U.S. Pat. No. 6,155,770 describes container loading and unloading apparatus that includes a container that is designed to be positioned on a platform of a vehicle. The container apparatus of this publication does not fits to platforms with sidewalls, the container is higher than 90 cm. The container apparatus of this publication is designed to corresponds and to be positioned only on the specific vehicle that includes guidance means, holes and pins in the container apparatus and in the platform of the vehicle (For examples elements 30, 42, 44 and 46) for anchoring the container to the platform.

DESCRIPTION OF THE DRAWINGS

The intention of the drawing attached to the application is not to limit the scope of the invention and its application. The drawing is intended only to illustrate the invention and it constitutes only one of its many possible implementations.

THE INVENTION

Figure 1:
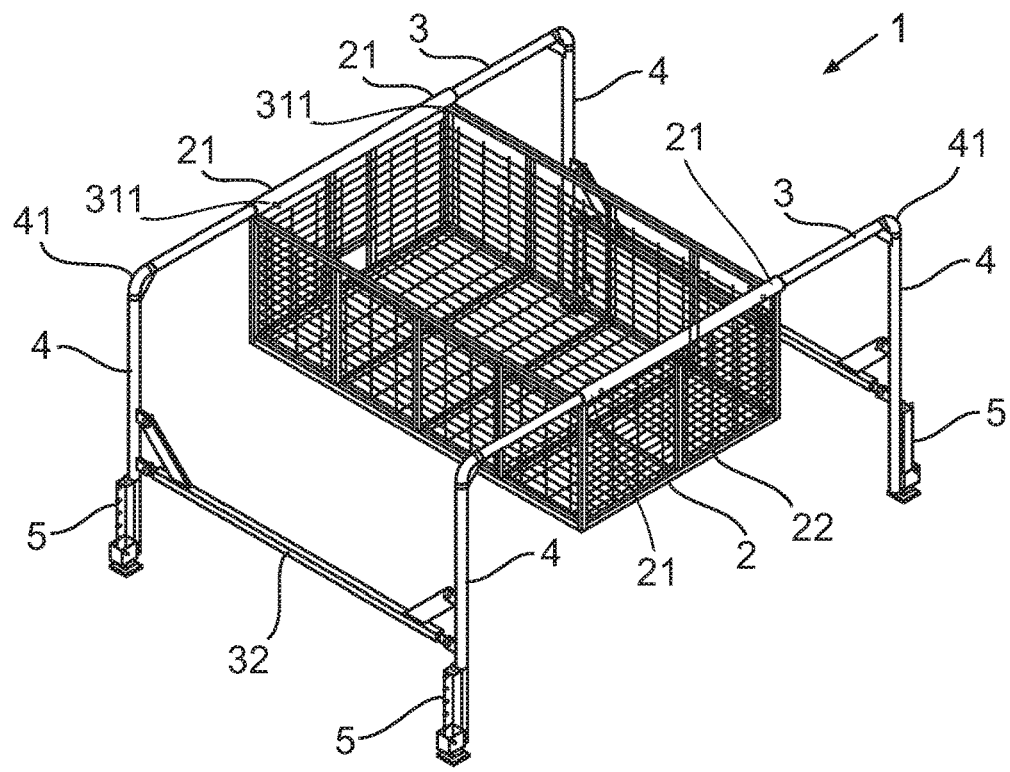
FIGS. 1 and 2 depict the adjustable transportation system (1), which comprises a cargo carrier basket (2), a frame (3), adjustable legs (4), and trailer jacks (5).

The main objective of the present invention is to provide a standalone adjustable transportation system (1) that comprises a cargo carrier basket (2), a frame (3), adjustable legs (4), and trailer jacks (5). The adjustable transportation system (1) is designed so that it may be positioned on any kind of a standard vehicle model that has a platform or on the open cargo area of pickup trucks, which may have two fixed sidewalls, and transported by these vehicles to the designated site. For the sake of clarity and fluency, we will use the term standard vehicle with a platform in the specification and in the claims as refers to trailers, cargo areas and vehicles in general of any standard vehicle model or pickup trucks that equipped with a platform that has two sidewalls.

A water tank may be installed on the cargo carrier basket (2), and it is obviously recommended that a flexible water tank be used since flexible water tanks offer several advantages over fixed-volume water tanks. When a need arises to supply water to an outdoor location, and the user wishes to transport a water tank, the standalone adjustable transportation system (1) can be installed on a standard vehicle with a platform, and a water tank can be placed on the cargo carrier basket (2) and transported to the designated site. Upon arriving at the site, the user assembles the frame (3) and connects it to the cargo carrier basket (2). Then, the adjustable legs (4) are assembled and connected the frame (3), and the standalone system (1) is raised using the trailer jacks (5), so that the vehicle may be moved out from under the standalone system (1), leaving the system in place with the water tank on its cargo carrier basket (2). The standard vehicle with a platform may now be driven away to be used for other tasks.

Figure 2:
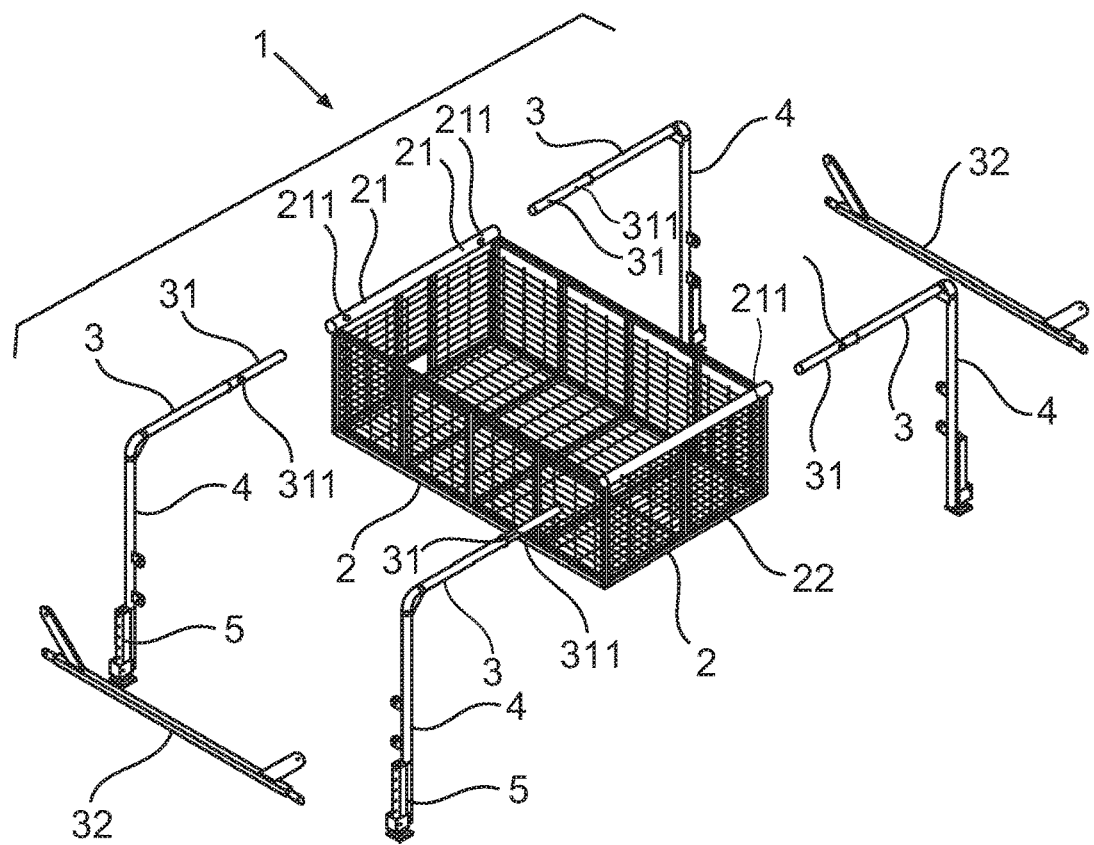

The expression "flexible water tanks" refers to inflatable tanks that were developed in order to maximize their storage and transportation efficiency. Flexible water tanks are made of a heavy-duty exterior layer, made of a material such as PVC, and an internal layer that complies with standards for the storage of drinking water. Flexible water tanks are typically equipped with a spigot through which the tank is filled and through which water is consumed. As mentioned, the standalone adjustable transportation system comprises a cargo carrier basket (2), a frame (3), adjustable legs (4), and trailer jacks (5). FIGS. 1 and 2 depict the standalone adjustable transportation system (1), which comprises a cargo carrier basket (2), a frame (3), adjustable legs (4), and trailer jacks (5).

The cargo carrier basket (2) is in fact a platform on which the water tank (100) is placed, and it may be flat or have side walls that prevent the water tank from falling off during transportation. The drawings accompanying this patent application depict a cargo carrier basket (2) with a platform comprising a lattice bottom and side walls, although the invention refers to other designs as well. The cargo carrier basket (2) consists of a basket (2) with four connecting means (21) that are intended to enable the user to attach the cargo carrier basket (2) to the frame (3). The connecting means (21) may be for example a hollow tube that can corresponds with the connecting means (311) when such connecting means is in a kind of a pin.

The frame (3) is designed so as to enable the user to assemble and connect the adjustable legs (4) to the cargo carrier basket (2). The frame comprises several horizontal rods (31), each of which is equipped with locking means (311) at either end. The locking means (311) may be a pin for example or a locker and the edge of the horizontal rods (31) they may serve as a connecting means.

The frame should have four horizontal rods (31), or more, to enable at least one horizontal rod (31) to be attached to each corner of the cargo carrier basket (2). The frame (3) may also include a bottom frame (32) that interconnects the legs (4) and thus reinforces and stabilizes the system (1).

Adjustable legs (4): The adjustable transportation system (1) is equipped with several adjustable legs (4) and, obviously, it is desirable that the system (1) have at least four such legs. The adjustable legs (4) are adjustable in the sense that the user may change their height in order to raise the cargo carrier basket (2) above the platform of the vehicle, thus "releasing" the vehicle while the standalone system (1) is positioned in a stable manner on the ground. The adjustable legs (4) also enable the system (1) to be used on non-level or uneven surfaces. Some or all of the adjustable legs (4) can be telescopic or can incorporate trailer jacks (5), which are usually located at the lower end of the leg. The upper end of the adjustable legs (4) is attached to the frame (3) by means of the connecting means (41) located at the upper end of each leg (4), which connects to a corresponding locking means (311) located at the end of the horizontal frame rod (31).

The trailer jacks (5) are designed to enable the user to shorten or lengthen the adjustable leg (4) so as to level the cargo carrier basket (2). The trailer jacks (5) can be operated manually, like a vehicle's jack, electrically, or pneumatically, wherein electricity and air pressure are provided by the towing vehicle or any other source. The user can raise the adjustable legs (4) using the trailer jacks jacking means (5) in order to stabilize the adjustable transportation system (1) on the designated site. The adjustable legs (4) can be permanently connected or they may be detachable, in which case the user attaches them to the frame (3) and detaches them according to need.

It is very important that the cargo carrier basket (2), on which the flexible water tank is placed, be horizontal and level and that it is at an angle when positioned at the designated site. If the flexible water tank is positioned at an angle, the water within the tank will apply both a horizontal force and a downward force at an angle, towards the lower side of the tank, which can cause the system to become instable, and to collapse, tilt, or overturn. Hence the importance of the adjustable legs (4) and trailer jacks (5), as mentioned above, which are designed enable the use to level the cargo carrier basket (2) on which the water tank is placed. The adjustable transportation system (1) can be used to transport not only water tanks, but any other equipment as well, according to need.

The connecting and locking means (21), (311) and (41) of the cargo carrier basket (2), the frame (3), and the legs (4), respectively, can be of a variety of types. For instance, the ends of the rods (31) and the legs (4) can serve themselves as connecting means, wherein one rod is inserted into another rod. It is also possible that said connecting means be composed of a hollow rod into which another rod is inserted, with a locking means, and so on.

Figure 3:
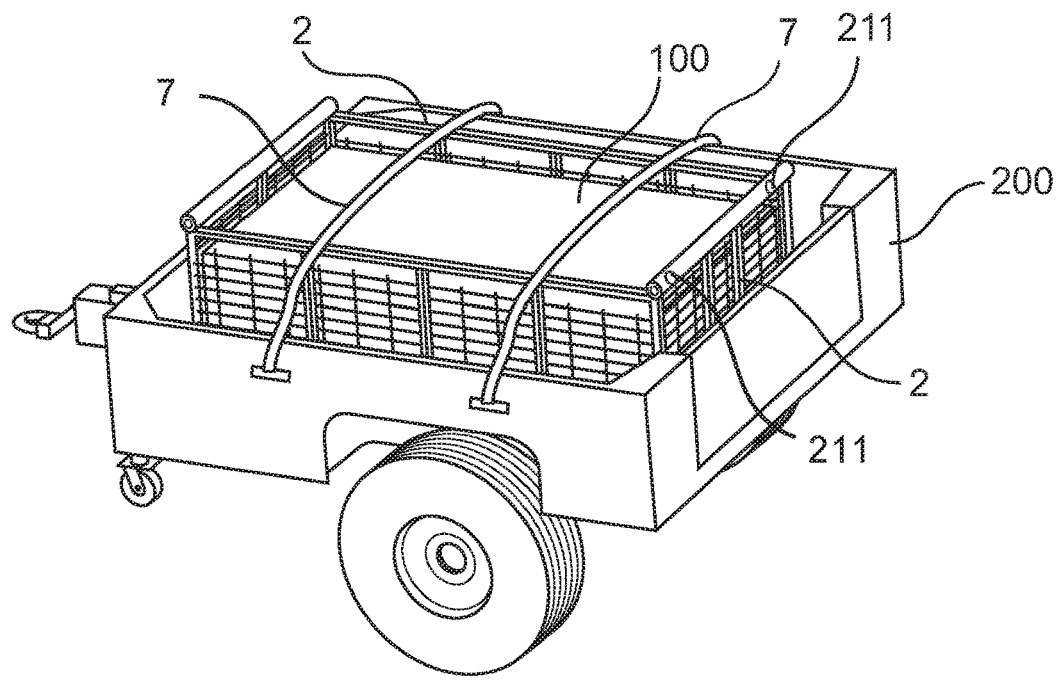
FIG. 3 depicts the cargo carrier basket (2), wherein it is installed on a standard vehicle with a platform (200) and is carrying a flexible water tank (100).
Figure 4:
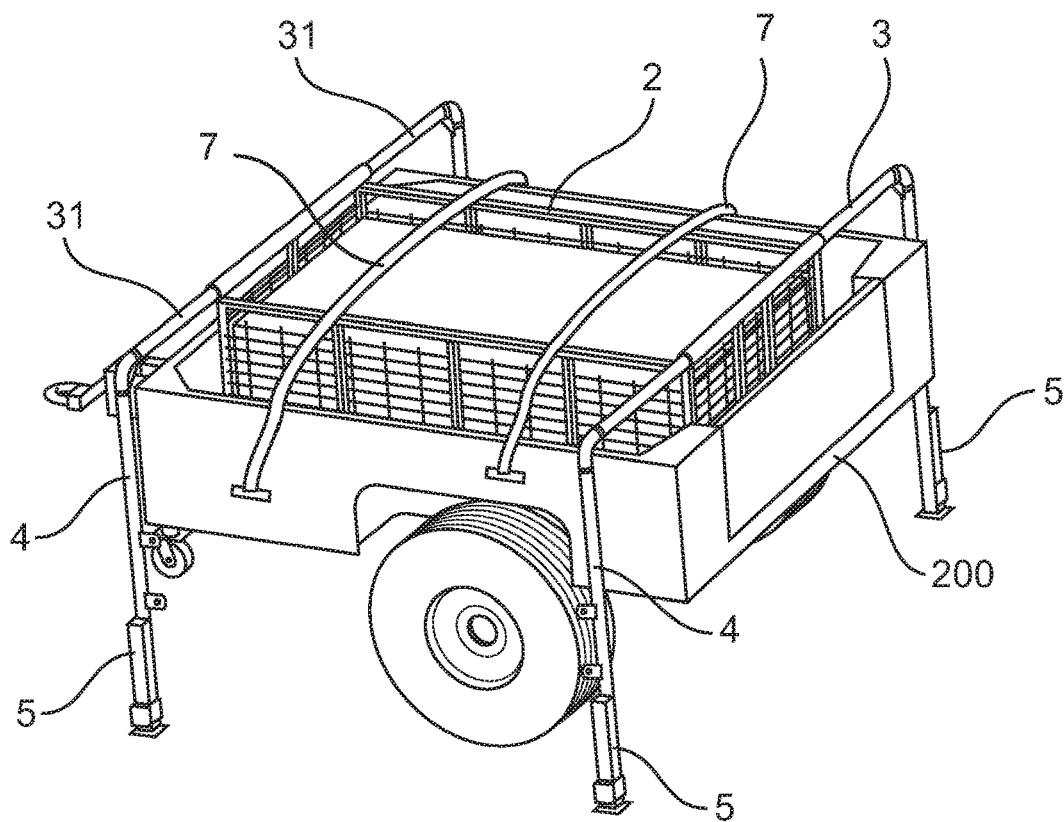
FIG. 4 depicts the adjustable transportation system (1), wherein the cargo carrier basket (2) is installed on a standard vehicle with a platform (200) and wherein the frame (3) and the adjustable legs (4) are assembled and attached.
Figure 5:
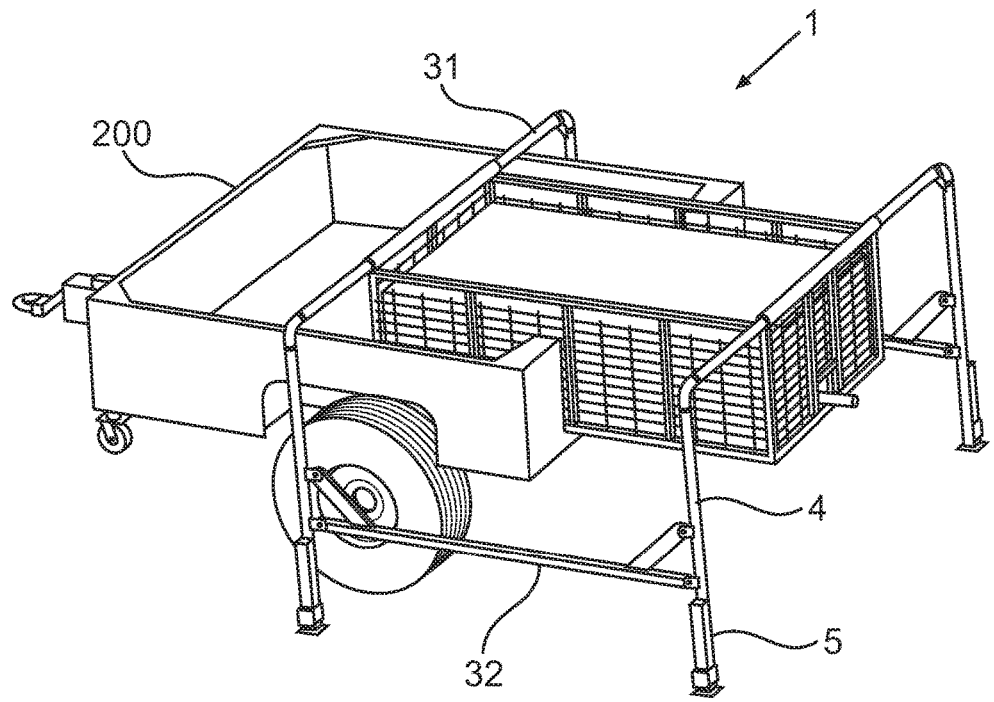
FIG. 5 depicts the adjustable transportation system (1) after it has been raise slightly above the standard vehicle with a platform (200) and the trailer has started to move out from under the system (1).
Figure 6:
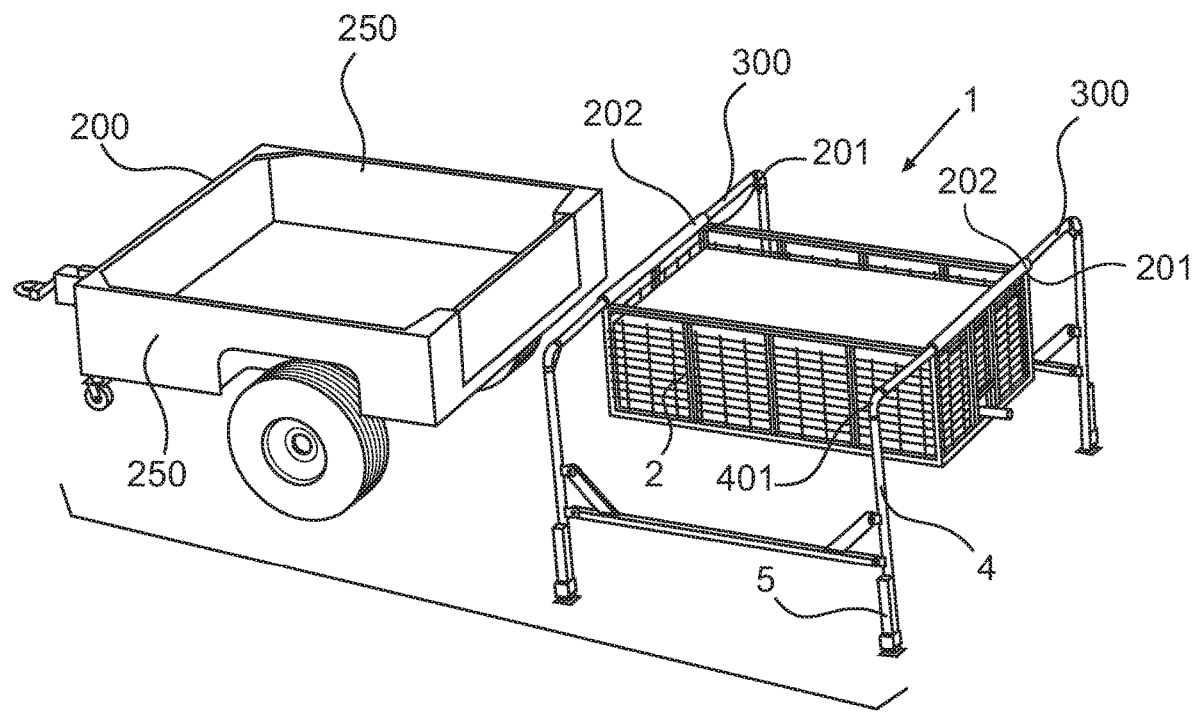
FIG. 6 depicts the adjustable transportation system (1) after the standard vehicle with a platform (200) has entirely moved out from under it.

FIG. 3 depicts the cargo carrier basket (2), wherein it is installed on a vehicle (200) and is carrying a flexible water tank (100). FIG. 4 depicts the standalone adjustable transportation system (1), wherein the cargo carrier basket (2) is installed on a vehicle (200) and wherein the frame (3) and the adjustable legs (4) are assembled and attached. FIG. 5 depicts the adjustable transportation system (1) after it has been raised slightly above the vehicle (200) and the vehicle has started to move out from under the system (1). FIG. 6 depicts the adjustable transportation system (1) after the vehicle (200) has entirely moved out from under it.

It is clear from the above that the system (1) subject matter of the present invention is in fact a standalone adjustable transportation system, also in the meaning that it is fitted to any standard vehicle with a platform (200), and not only to a specific models of trucks to which such systems may be fitted, for example as of patent 503.

From the explanations above and the accompanied drawings it is understood that the present invention refers to a standalone adjustable transportation system (1) that is designed to be positioned on a platform of a vehicle (200) and that this system consists only the cargo carrier basket (2), the frame (3) and the four adjustable legs (4) that each one of them has a trailer jack (5).

The cargo carrier basket (2) consists of the basket (22) that has four connecting means (21) that each one of them includes a locking means (211). The connecting means (21) can be for example a hollow pipe as described for example in the drawings.

The frame (3) consists of four horizontal rods (31) that each one of them includes a locking means (311) that corresponds with the locking means (211) of the connecting means (21). The locking means (211) of the connecting means (21) can be for example a hole while a corresponding springy ball can serve as the locking means (311) of the horizontal rods (31) or a corresponding hole that can serve as the locking means (311) of the horizontal rods (31) with a matching pin.

Each trailer jack (5) is designed to control a length of the adjustable leg (4) to which it is assembled.

The horizontal rods (31) are designed to be connected to and disconnected from the connecting means (21) and to connect the frame (3) to the cargo carrier basket (2). The locking means (311) of the horizontal rods (31) are deigned to be locked together with the locking means (211) of the connecting means (21) of the cargo carrier basket (2).

The adjustable legs (4) are designed to be connected to and disconnected from the horizontal rods (31) of said frame (3). The trailer jacks (5) enable a user to control separately a precise length of each one of said adjustable legs (4).

The cargo carrier basket (2) while positioned on the platform of the vehicle is designed to be anchored to the platform by gravity of the cargo carrier basket (2) itself only or additionally by tying the cargo carrier basket (2) by tying straps (7).

The user can place the cargo carrier basket (2) on the platform, to drive the vehicle and to stop in the destination, to assemble the frame to the cargo carrier basket (2), to raise the cargo carrier basket (2) at a horizontal and level position above the platform (200) by the trailer jacks (5) and by that to enable the vehicle with the platform (200) to drive away and leave the standalone adjustable transportation system (1) as placed on the ground while the cargo carrier basket (2) is at a horizontal and level position even on potholes, non-level and uneven ground. The system (1) enables the user to convert any vehicle with a platform to a vehicle that can transport the cargo carrier basket, to place the cargo carrier basket on the ground and to release the vehicle the platform to other missions, and vice versa.

The present invention refers also to a method for transporting a cargo carrier basket that is designed to receive a cargo on any standard vehicle with a platform, placing the cargo carrier basket on the ground and releasing the vehicle. The method includes the following equipment and steps:

(a) Providing a standalone adjustable transportation system that comprises a cargo carrier basket, a frame, four or more adjustable legs, and four or more trailer jacks; said frame is designed to connect said four or more adjustable legs to the cargo carrier basket; wherein each of said four or more jack trailers is assembled to each of said four or more adjustable legs; wherein each of said four or more trailer jacks is designed to control separately the length of the adjustable leg to which it is assembled; and wherein enabling to control the precise length of each adjustable leg separately from the other adjustable legs;

(b) Placing the cargo carrier basket on a platform of said standard vehicle with a platform;

(c) Enabling a user to place cargo on said cargo carrier basket;

(d) Enabling the user to drive said standard vehicle with a platform while said cargo carrier basket is on said platform of said standard vehicle with a platform to a destination;

(e) Enabling the user to connect said frame with said four or more adjustable legs to the cargo carrier basket and by that to assemble the standalone adjustable transportation system;

(f) Placing said standalone adjustable transportation system on the ground while said cargo carrier basket is above said platform and enabling the standard vehicle with a platform to move away and leaving said standalone adjustable transportation system as placed on the ground;

(g) Placing said standalone adjustable transportation system on the ground while the cargo carrier basket is at a horizontal and level position even on potholes, non-level and uneven ground; and Whereby enabling to convert any vehicle with a platform to a vehicle that can transport a cargo carrier basket that may include a cargo, enabling the placement of said cargo carrier basket that may include a cargo on the ground and enabling to release said any vehicle with a platform.

It is possible to describe the standalone adjustable transportation system (1) as depicted in FIG. 6 as one that is designed to be positioned on a platform of a vehicle that has two fixed sidewalls (250) and that it is consisting of:

(a) The cargo carrier basket (2) is with a height ranging from 50 cm to 90 cm. This height range fits to platforms that have fixed sidewalls that are usually in such heights. The cargo carrier basket has four upper corners (201) and to each of which is connected a hollow tube (202) or any other means that can be used to connect the basket to the legs.

(b) The four adjustable legs (4) that each one of them has the trailer jack (5) that is designed to control the length of the adjustable leg to which it is assembled.

(c) Four connecting rods (300) that each of which can be inserted into the hollow tubes.

The connecting rods are designed to be connected to and disconnected from said cargo carrier basket, and are also designed to be connected to and disconnected from tops (401) of the adjustable legs.

The cargo carrier basket while positioned on the platform is designed to be anchored to the platform by gravity of the cargo carrier basket itself only or additionally by tying the cargo carrier basket by tying straps, and can be connected in its four top corners to the four adjustable legs by the four connecting rods over the two fixed sidewalls.

The present invention discloses also a method for transporting a cargo carrier basket with a height ranging from 50 cm to 90 cm that is designed to receive a cargo on a vehicle with a platform that has two fixed sidewalls, for placing the cargo carrier basket on the ground and releasing the vehicle, comprising:

(a) providing the cargo carrier basket, wherein said cargo carrier basket has four upper corners (201) to each of which is connected a hollow tube;

(b) providing four adjustable legs that each one of them has a trailer jack that is designed to control a length of the adjustable leg to which it is assembled;

(c) providing four connecting rods that each of which can be inserted into said hollow tubes;

wherein said connecting rods are designed to be connected to and disconnected from said cargo carrier basket;

wherein said connecting rods are designed to be connected to and disconnected from tops of the adjustable legs;

wherein said cargo carrier basket while positioned on the platform is designed to be anchored to the platform by gravity of the cargo carrier basket itself only or additionally by tying the cargo carrier basket by tying straps;

wherein said cargo carrier basket while positioned on the platform that has two fixed sidewalls can be connected in its four top corners to the four adjustable legs by the four connecting rods over said two fixed sidewalls;

(d) placing the cargo carrier basket on the platform of the vehicle, whereby enabling a user to place cargo on the cargo carrier basket and to drive the vehicle with the cargo carrier basket to a destination;

(e) connecting horizontally the four connecting rods to the hollow tubes at the four top corners of the cargo carrier basket over the two fixed sidewalls of the platform when arriving to the destination and connecting the four connecting rods to the tops of the adjustable legs;

(f) placing the cargo carrier basket on ground by operating the trailer jacks while the cargo carrier basket is above the platform and enabling the vehicle to move away and leaving the cargo carrier basket as placed on the ground;

whereby enabling to convert a vehicle with a platform that has two fixed sidewalls to a vehicle that can transport the cargo carrier basket that may include a cargo, enabling the placement of said cargo carrier basket that may include a cargo on the ground and enabling to release said vehicle.

What is claimed is:

1. A standalone adjustable transportation system that is designed to be positioned on a platform of a vehicle that has two fixed sidewalls, consisting of:
   a cargo carrier basket with a height ranging from 50 cm to 90 cm, wherein said cargo carrier basket has four upper corners to each of which is connected a hollow tube;
   four adjustable legs that each one of them has a trailer jack that is designed to control a length of the adjustable leg to which it is assembled;
   four connecting rods that each of which can be inserted into said hollow tubes;
   wherein said connecting rods are designed to be connected to and disconnected from said cargo carrier basket; wherein said connecting rods are designed to be connected to and disconnected from tops of the adjustable legs;
   wherein said cargo carrier basket while positioned on the platform is designed to be anchored to the platform by gravity of the cargo carrier basket itself only or additionally by tying the cargo carrier basket by tying straps; and
   wherein said cargo carrier basket while positioned on the platform that has two fixed sidewalls can be connected in its four top corners to the four adjustable legs by the four connecting rods over said two fixed sidewalls.

2. A method for transporting a cargo carrier basket with a height ranging from 50 cm to 90 cm that is designed to receive a cargo on a vehicle with a platform that has two fixed sidewalls, for placing the cargo carrier basket on the ground and releasing the vehicle, comprising:
   (a) providing the cargo carrier basket, wherein said cargo carrier basket has four upper corners to each of which is connected a hollow tube;
   (b) providing four adjustable legs that each one of them has a trailer jack that is designed to control a length of the adjustable leg to which it is assembled;
   (c) providing four connecting rods that each of which can be inserted into said hollow tubes;
   wherein said connecting rods are designed to be connected to and disconnected from said cargo carrier basket;
   wherein said connecting rods are designed to be connected to and disconnected from tops of the adjustable legs;
   wherein said cargo carrier basket while positioned on the platform is designed to be anchored to the platform by gravity of the cargo carrier basket itself only or additionally by tying the cargo carrier basket by tying straps;
   wherein said cargo carrier basket while positioned on the platform that has two fixed sidewalls can be connected in its four top corners to the four adjustable legs by the four connecting rods over said two fixed sidewalls;
   (d) placing the cargo carrier basket on the platform of the vehicle, whereby enabling a user to place cargo on the cargo carrier basket and to drive the vehicle with the cargo carrier basket to a destination;
   (e) connecting horizontally the four connecting rods to the hollow tubes at the four top corners of the cargo carrier basket over the two fixed sidewalls of the platform when arriving to the destination and connecting the four connecting rods to the tops of the adjustable legs;
   (f) placing the cargo carrier basket on ground by operating the trailer jacks while the cargo carrier basket is above the platform and enabling the vehicle to move away and leaving the cargo carrier basket as placed on the ground; and
   whereby enabling to convert a vehicle with a platform that has two fixed sidewalls to a vehicle that can transport the cargo carrier basket that may include a cargo, enabling the placement of said cargo carrier basket that may include a cargo on the ground and enabling to release said vehicle.

* * * * *